W. BLAIR.
VEHICLE WHEEL.
APPLICATION FILED AUG. 7, 1917.

1,307,611.

Patented June 24, 1919.
7 SHEETS—SHEET 2.

UNITED STATES PATENT OFFICE.

WILLIAM BLAIR, OF COVENTRY, ENGLAND, ASSIGNOR TO RUDGE-WHITWORTH LIMITED, OF COVENTRY, ENGLAND.

VEHICLE-WHEEL.

1,307,611.

Specification of Letters Patent. Patented June 24, 1919.

Application filed August 7, 1917. Serial No. 184,961.

*To all whom it may concern:*

Be it known that I, WILLIAM BLAIR, a subject of the King of Great Britain and Ireland, residing at Rudge Works, Coventry, England, have invented certain new and useful Improvements in or Relating to Vehicle-Wheels, of which the following is a specification.

This invention relates to disks or shields for covering in the spokes of vehicle wheels.

An earlier specification describes disks formed of flexible material, such as oiled silk, mounted upon flat rigid rings of metal or other material which are attached to a wheel by pressing them against the sides of the wheel rim by means of a plurality of bolts or like screw-threaded attachment means.

The object of the present invention is to simplify and improve the method of forming and attaching such flexible disks.

The invention consists in spoke covering means for a vehicle wheel in which a flexible disk upon the outer side has a radially distortable resilient circumferential ring which is sprung into engagement with inwardly turned fixed stiffening and retaining means situated around the wheel rim outside the periphery of the disk.

The invention further consists in improvements in or relating to vehicle wheels whereby a circular woven or like flexible wheel cover is tensioned when in position on the wheel by axial pressure at its central portion while its stiffened outer edge is held concentrically or approximately concentrically positioned behind a flange bead or other means of support projecting inwardly from the wheel rim.

The invention further consists in improvements in or relating to vehicle wheels whereby an annular woven or like flexible wheel cover is tensioned when in position on a wheel by axial pressure regularly distributed around adjacent to one or both of its peripheral edges, which pressure causes the stiffened edges of the cover to press closely against the rim, hub or such like parts of the wheel.

The invention further consists in means for holding a cover disk of the type indicated, said means comprising a lug formed to bed upon the interior of the wheel rim and with its outer end turned toward the wheel axis for retaining the circumference of the disk, said lug being attached by placing it upon the thinner portion of the spoke and sliding it outward to firmly clip the nipple adjacent to the rim where it may be held by a tail-piece engaging abutment means, such as the uncovered threads of the spoke.

The invention also consists in the improvements in wheel spoke covering disks and attachment means therefor as hereinafter described.

Referring now to the accompanying drawings:—

Figure 1:
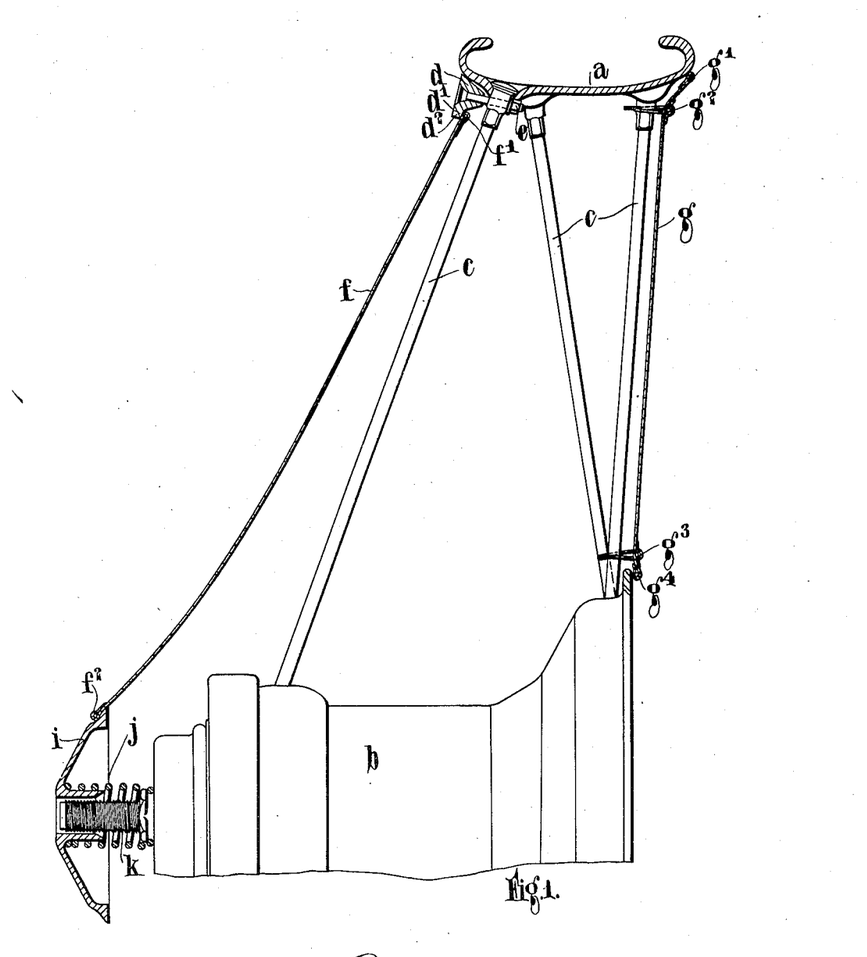
Figure 1 is a partial section of a vehicle wheel fitted with spoke covering disks in accordance with this invention.

In carrying the invention into effect, as shown by way of example in Fig. 1, *a* is the rim, *b* the hub and *c* the spokes of an ordinary tension wire spoked motor vehicle or like wheel.

The wheel is provided with a ring *d* which may be of the cross-section shown throughout its whole circumference and constructed of aluminium or other light material. Alternatively a ring of sheet material may be employed which conforms to the contour indicated upon its outer and axially facing surfaces, the ring in either case being connected to the wheel by bolts or the like *e* arranged to coöperate with means engaging the inner side of the spoke nipples.

Figure 6:
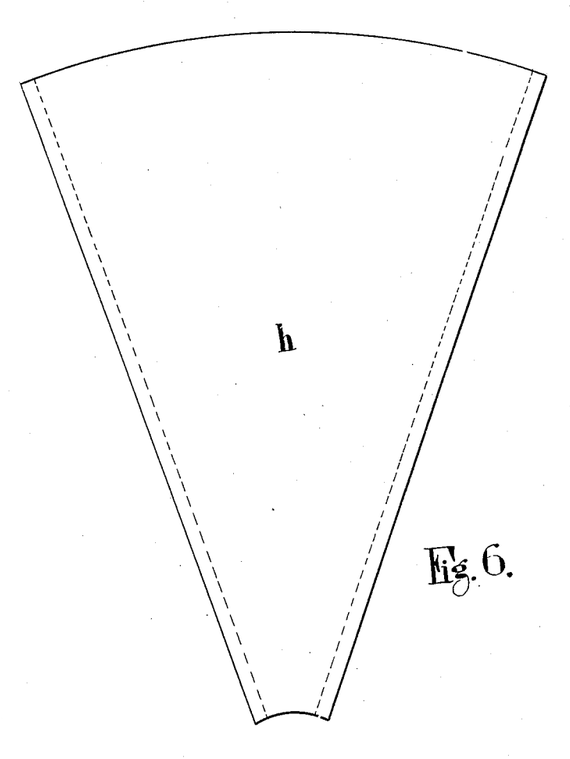
Fig. 6 is a diagram of one of the sections of canvas or other fabric used for forming a covering disk.

The disks *f* and *g* are preferably formed by connecting along their radial edges a plurality of sections *h* of the type shown in Fig. 6, these sections being cut from canvas or like suitable woven material of a shape to give the required contour and in such a manner that the warp and woof strands are similarly directed in each section, one or the other being conveniently positioned parallel to the longitudinal center lines of the sections.

The outer cover $f$ which has a central aperture for the reception of a cap $i$ is provided around each of its peripheral edges with a spring steel or like resilient wire ring $f'$ or $f^2$ which is capable of being deflected without assuming a permanent set and may be permanently attached to the cover within a turned over portion of the edge.

The ring $f'$ is of such a length that it will be accommodated concentrically within the ledge $d'$ formed on the inner side of the ring $d$, and at the same time it will be capable of being placed in position on the wheel by pushing the ring $f'$ down to the extreme radial limit of the ring $d$ upon one side of the wheel and springing it under the lip or edge $d^2$ of the ring $d$ upon the other side.

The ring $f^2$ is seated upon a step or recess around the periphery of the cap $i$ and the whole of the cover is conveniently tensioned by a coiled spring $j$ or like resilient member which presses the cap $i$ in an axial direction away from the end of the hub. The cap $i$ and spring $j$ may be conveniently carried upon a lubricating member $k$ projecting from the hub of the wheel.

The disk $g$ upon the inner side of the wheel is provided with two pairs of concentric rings $g'$, $g^2$, and $g^3$, $g^4$, surrounding its peripheral edges, each pair of rings inclosing an annulus of suitable width surrounding the edge of the disk. The inner rings $g^2$ and $g^3$ of each pair are connected by wire ties, as shown in Fig. 1, or by small diameter coiled springs or like resilient members, as shown in Fig. 2, with the spokes of the wheel, and by this means the outer rings $g'$ and $g^4$ of each pair are pressed tightly in contact with the rim, hub flange, or other adjoining portion of the wheel.

In the arrangement as described it will be obvious that the inner side disk $g$ must be attached prior to the outer side one, and in view of the more elaborate means of attachment it becomes more or less a permanent part of the wheel. The outer disk $f$ is readily manipulated by springing it into or out of engagement with the ring $d$ and by this means any part of the wheel is rendered easily accessible without the removal of the inner disk $g$.

Figures 2, 2A:
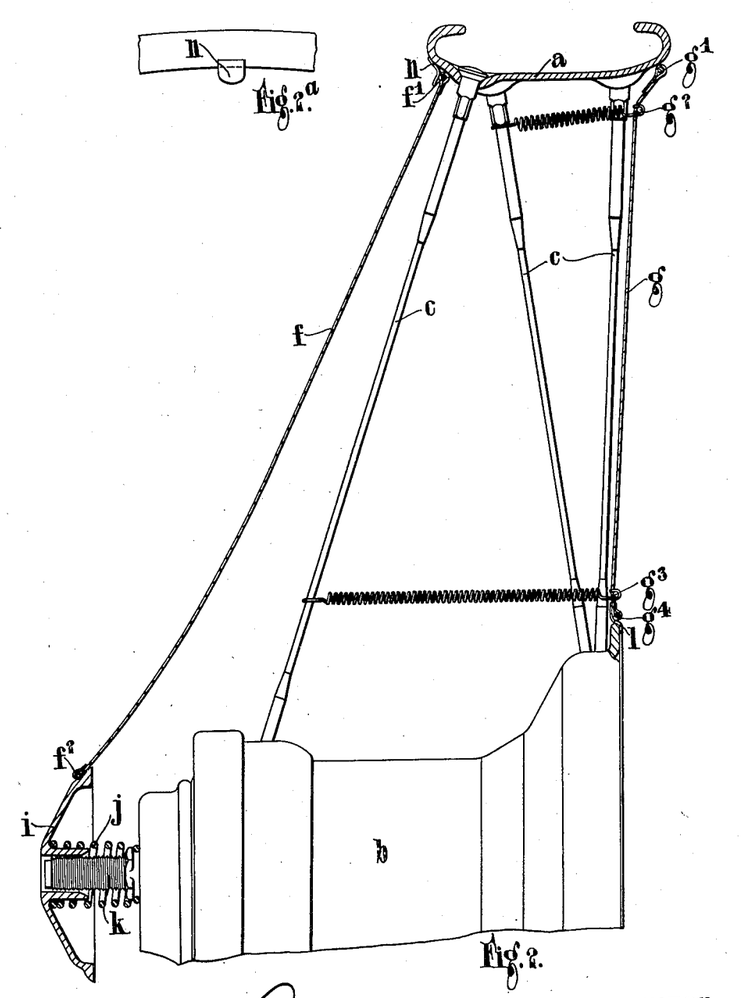
Figs. 2 and 2ª show another way of carrying the invention into effect.

The inner edge of the inner disk $g$ instead of being pressed directly against the flange of the hub $b$ may be accommodated upon a step formed in a seating ring $l$, as shown in Fig. 2. The seating ring is formed from a flat annulus of sheet or like material which is stamped or otherwise shaped so as to constitute two concentric flat rings lying in adjacent parallel planes and connected by a concentric stepped or cylindrical portion. The step upon one side of the seating ring accommodates the ring $g^4$ of the disk $g$ and upon the other side it forms a means of registering the ring $l$ with the flange of the hub $b$ and thus holding the disk concentric with the wheel.

Figure 3:
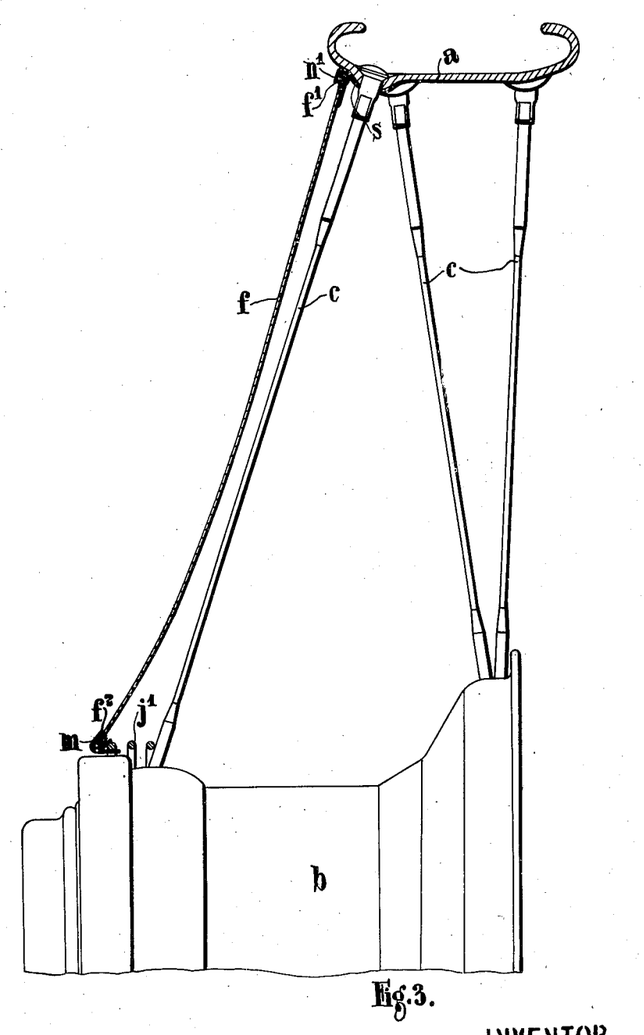
Figs. 3 and 4 show modifications in the arrangement of the outer covering disk.
Figure 4:
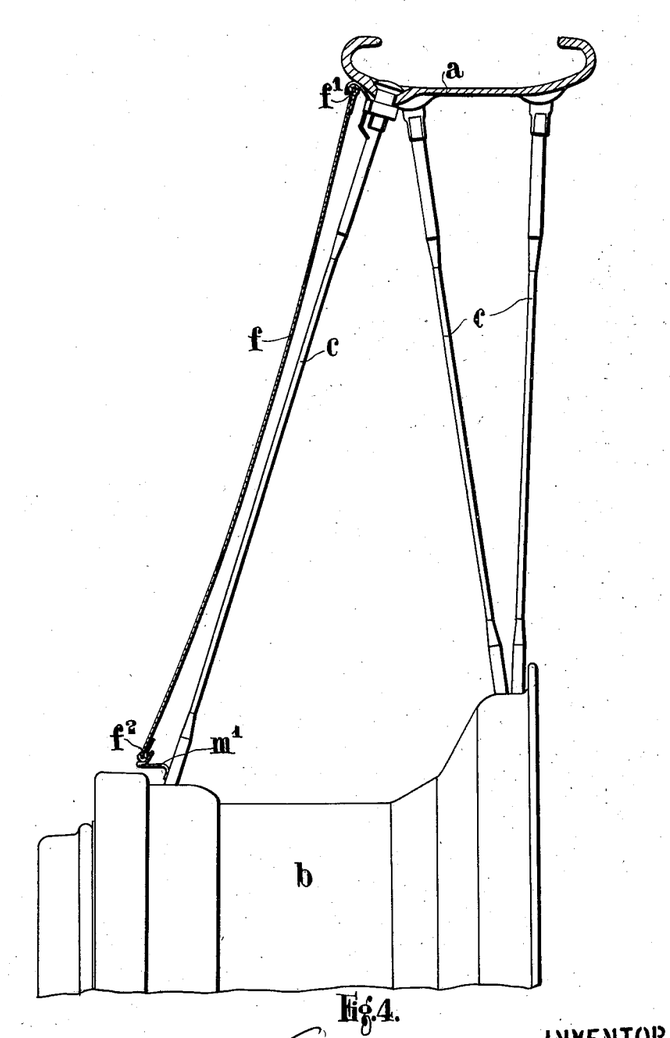

Instead of supporting the inner ring $f^2$ of the outer disk $f$ upon a cap, such as $i$, the ring $f^2$ may be made of such a diameter that it will pass over the hub retaining nut, as shown in Figs. 3 and 4. In such a construction the ring may be carried upon a light stamped or spun sheet metal member, such as $m$ or $m'$ and the disk may be tensioned by means of a large diameter coiled spring $j'$ surrounding the hub retaining nut and pressing upon the spokes, as in Fig. 3, or the tension provided by inserting the outer wire of the disk under retaining means alone may be relied upon, as shown in Fig. 4.

Instead of a ring $d$, as shown in Fig. 1, the outer ring $f'$ of the outer cover may be held in position by a plurality of lugs or stops $n$ as shown in Figs. 2 and 2ª, a convenient number, say ten, lugs being equidistantly positioned around a circle slightly exterior to the outermost row of spoke nipples and being attached to the rim by soldering or in any other convenient way. In such a construction the diameter of the outer stiffening ring $f'$ of the disk is such that in an unstrained condition it will just lie within the rim on a plane slightly within the lugs. Due to its radial resilience it is easily inserted behind them after they have been attached to the rim by applying the cover to the wheel in a slightly eccentric position with the periphery behind the majority of the lugs. Attachment is then completed by inserting the ring $f'$ behind each of the remaining lugs in succession by means of a suitable lever or the like.

As shown in Fig. 3, a series of stops or lugs $n'$ may be formed as inwardly turned projections from a hoop or band of thin material $s$, this band being positioned so as to bed closely against the surface of the rim and having depressions and holes corresponding with the rim for accommodating the spoke nipples by means of which it is firmly held when in position in a built up wheel. A ring such as $s$ may also, if desired, be provided with an inturned flange or bead corresponding to the contour of the interior portion $d'$ and $d^2$ of the ring $d$ in Fig. 1, and capable of accommodating the ring $f'$ in the manner already described in connection therewith.

Figure 7:
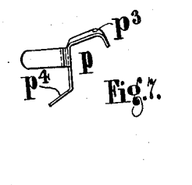
Figs. 7, 8 and 9 show details of a retaining lug clip.
Figure 8:
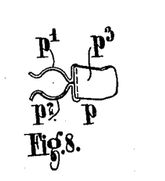
Figure 9:
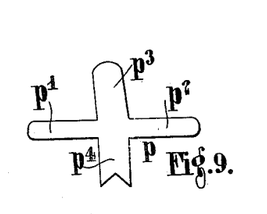
Figures 10, 12:
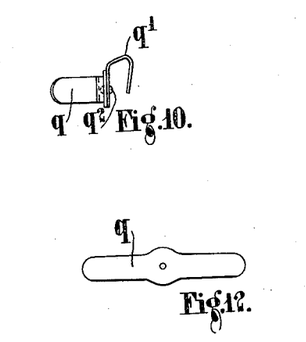
Figs. 10, 11, 12 and 13 show a modified form of the last-mentioned device.
Figure 11:
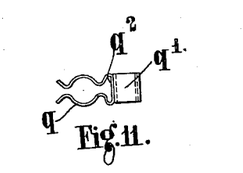
Figure 13:
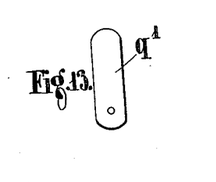

Instead of fixing stops or lugs, such as $n$, to the rim of the wheel by soldering or other means the lugs may be formed in the manner shown in Figs. 7, 8 and 9 as easily attachable members $p$ provided with encircling portions $p'$, $p^2$, for clipping on to the spoke nipples.

A lug of this type may be conveniently formed from a blank $p$, shown in Fig. 9, such blank being stamped from spring steel or like sheet material in the shape of a cross and having one pair of opposite arms, $p'$, $p^2$, somewhat longer and narrower than the other pair $p^3$, $p^4$. The arms $p'$, $p^2$, are folded back, as shown in Fig. 8, and bent around to form almost a complete circle having an opening upon its farther side with two outwardly turned lips. The opening is just wide enough to spring over the smallest portion of a spoke and the circle formed by the arms $p'$, $p^2$ is of such a diameter that it will firmly grip the circular portion of a spoke nipple when pushed over it by sliding the clip along the spoke. The arm $p^3$, which is provided with a rounded outer end, is turned outward and downward, as shown in Fig. 7, the outward turned portion being shaped to bed upon the inner side of the rim when the clip is positioned upon a spoke nipple and the downward turned portion forming the lug for retaining the peripheral ring of the disk. The arm $p^4$ is provided with a V-shaped or like notch at its extremity and is carried down and turned inward so that when the clip is pushed tightly home upon a nipple the notched end will engage one of the few threads of the spoke generally left uncovered by the nipple. In the absence of such threads a suitable ridge or the like may be formed upon the spoke or nipple end in any convenient manner.

An easily attachable lug of the type last described may also be formed, as shown in Figs. 10, 11, 12 and 13, from two pieces $q$ and $q'$ movably connected together by means of a rivet or the like $q^2$. In such a construction the piece $q$ may take the form of the arms $p'$, $p^2$, of Fig. 9, and the other member $q'$ will be a straight portion pivotally attached by means of the rivet and corresponding with the member $p^3$ of Fig. 9. The parts will be shaped as already described and by suitably swiveling or inclining the piece $q'$ with respect to the remainder of the device it may be caused to bed accurately against the surface of the wheel rim when the clip is attached to a spoke having a considerable inclination to the radial. The member $p^4$ for engaging an abutment or the like of the spoke is omitted from the device last described.

Figure 5:
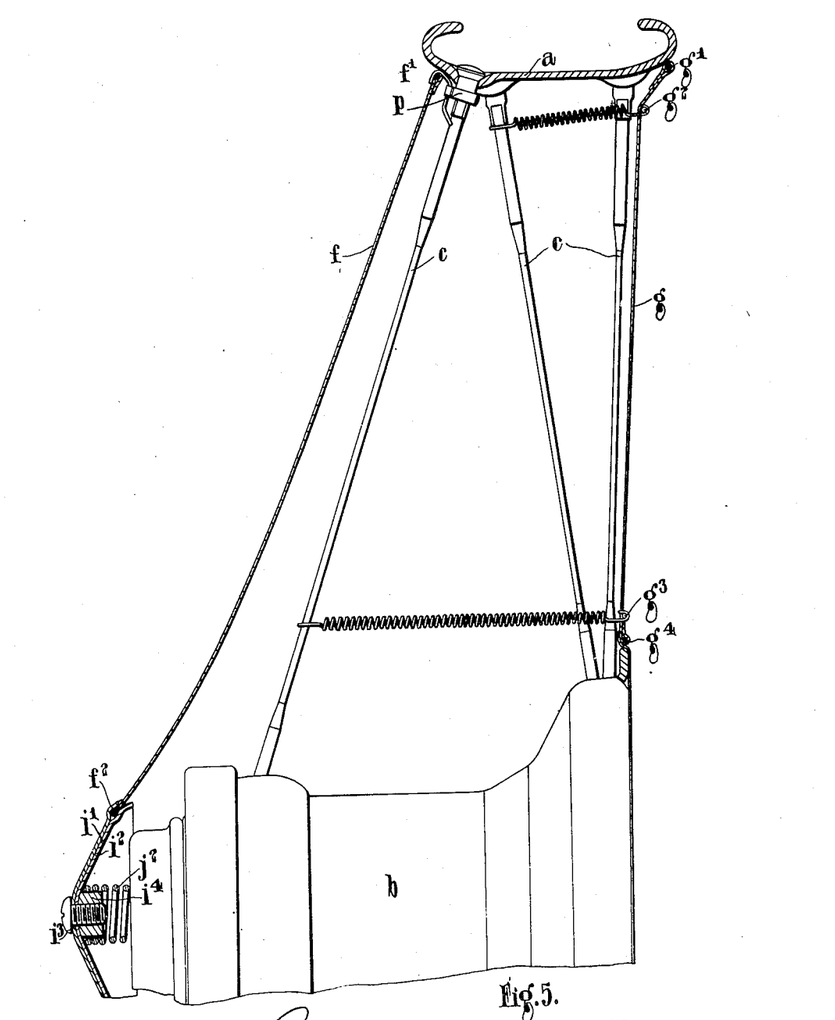
Fig. 5 shows convenient constructions of disks for fitting to both sides of a wheel.

The readily attachable clip lugs just described form a convenient means for attaching spoke covering disks to wheels when it is desired to avoid the trouble of sending a vehicle to a garage or the like for having a ring or lugs permanently fastened to the wheels. Under such conditions the construction shown in Fig. 5 may be adopted and the center of the outer disk may be supported upon a cap $i$ formed of two corresponding thicknesses of material $i'$ and $i^2$ which are so arranged that when closely pressed together by means of a central bolt $i^3$ they provide a groove around the circumference between the two members in which groove the inner peripheral ring $f^2$ of the outer cover may be firmly gripped. The bolt $i^3$ is provided with a suitably shaped nut $i^4$ to which may be attached a coiled spring $j^2$ for pressing against the end of the hub and suitably tensioning the material of the disk.

If it is preferred to tension a disk by axial pressure other than that provided by resilient means, a screw thread may be provided on some external part of the hub and a nut positioned thereon may be provided with a ridge or step for engaging the inner ring $f^2$ or $g^4$ of a disk and with a portion projecting through the aperture by means of which the nut may be turned. In such a construction the disk is tensioned by screwing back the nut after the outer peripheral edge has been secured behind a retaining ring or lugs.

It will be clear that further modifications in the construction and manner of carrying this invention into effect may be introduced without in any way departing from the spirit thereof.

Claims:
1. Spoke covering means for vehicle wheels comprising a flexible disk, a radially distortable, resilient ring carried thereby and inwardly turned fixed stiffening and retaining means for the disk carried by the wheel, substantially as described.

2. Spoke covering means for vehicle wheels comprising a woven or like flexible shield, a pair of concentric rings carried thereby, the said rings being adapted to stiffen an annulus adjoining a periphery, the outer edge of the annulus being held against the adjoining surface of the wheel by force applied to the inner portion of the annulus substantially as described.

3. Spoke covering means for vehicle wheels comprising a tensioned flexible disk having a central aperture, the inner and outer peripheral edges of the disk being resiliently stiffened, the said edges being pressed closely against the adjoining surfaces of the wheel part by axial pressure regularly distributed around either edge, substantially as described.

4. Spoke covering means as claimed in claim 1 in which the retaining means for the disk are a plurality of lugs distributed around and projecting inwardly from the wheel rim, substantially as described.

5. Spoke covering means for vehicle wheels comprising a flexible disk, a radially distortable, resilient ring carried thereby and inwardly turned fixed stiffening and retaining means for the disk carried by the wheel, said means comprising a lug positioned upon a wheel spoke and firmly gripping the nipple thereof to maintain the required position for retaining the disk, substantially as described.

6. In combination with a wheel having spokes, a flexible member extending substantially from the wheel hub to the rim and overlying the spokes, a ring at the middle of the member and a resilient ring at the outer edge of the member engaging a bearing at the rim.

7. In combination with a wheel having spokes, a flexible member extending substantially from the wheel hub to the rim and overlying the spokes, a ring at the middle of the member and a resilient ring at the outer edge of the member engaging a bearing at the rim, said bearing overhanging and retaining the resilient ring, substantially as described.

8. In combination with a wheel having spokes, a flexible member extending substantially from the wheel hub to the rim and overlying the spokes, a ring at the middle of the member and a resilient ring at the outer edge of the member engaging a bearing at the rim, and means for tensioning the flexible member, said means exerting its force axially at the center of the member.

9. In combination, a spoked wheel, a covering member at the inner side of the wheel, means for holding said member to the wheel accessible for attachment or detachment only at the inner side of said member and a covering member for the outer side of the wheel, comprising a resilient ring adapted to be sprung into connection with the wheel, substantially as described.

10. In combination with a wheel having spokes, a flexible member extending substantially from the wheel hub to the rim and overlying the spokes, a ring at the middle of the member and a resilient ring at the outer edge of the member engaging a bearing at the rim, and means for tensioning the flexible member, substantially as described.

11. Spoke covering means for vehicle wheels comprising a flexible disk, stiffening means along the edges of the disk, means for fastening the disk to the wheel, and means for holding the disk in conical shape, said means consisting of strained resilient means exerting force parallel with the axis of the wheel.

In testimony whereof, I have affixed my signature this 12th day of July 1917.

WILLIAM BLAIR.